United States Patent
Höglund et al.

(10) Patent No.: US 12,012,878 B2
(45) Date of Patent: Jun. 18, 2024

(54) ACTUATOR AND METHOD FOR OPERATING AN ACTUATOR

(71) Applicant: FREEVALVE AB, Ängelholm (SE)

(72) Inventors: Anders Höglund, Munka Ljungby (SE); Eric Griess, Viken (SE); Daniel Jakobsson, Hässleholm (SE); Urban Carlson, Helsingborg (SE)

(73) Assignee: FREEVALVE AB, Ängelholm (SE)

( * ) Notice: Subject to any disclaimer, the term of this patent is extended or adjusted under 35 U.S.C. 154(b) by 53 days.

(21) Appl. No.: 17/908,435

(22) PCT Filed: Mar. 1, 2021

(86) PCT No.: PCT/SE2021/050165
§ 371 (c)(1),
(2) Date: Aug. 31, 2022

(87) PCT Pub. No.: WO2021/177876
PCT Pub. Date: Sep. 10, 2021

(65) Prior Publication Data
US 2023/0088803 A1   Mar. 23, 2023

(30) Foreign Application Priority Data
Mar. 2, 2020   (SE) .................................... 2050230-8

(51) Int. Cl.
*F01L 1/46*   (2006.01)
*F01L 9/16*   (2021.01)

(52) U.S. Cl.
CPC ................ *F01L 1/465* (2013.01); *F01L 9/16* (2021.01); *F01L 2820/034* (2013.01)

(58) Field of Classification Search
CPC ................ F01L 9/10; F01L 9/16; F01L 1/465
See application file for complete search history.

(56) References Cited

U.S. PATENT DOCUMENTS 10,077,689 B2 *  9/2018  Hoglund ............... F15B 11/064
10,184,361 B2 *  1/2019  Hoglund ................... F01L 9/10
(Continued)

FOREIGN PATENT DOCUMENTS

CN         106870131 A  *  6/2017  .............. F01L 1/267
EP         0 722 039          7/1996
(Continued)

OTHER PUBLICATIONS

International Search Report for PCT/SE2021/050165 dated Mar. 17, 2021, 6 pages.
(Continued)

*Primary Examiner* — Ngoc T Nguyen
(74) *Attorney, Agent, or Firm* — NIXON & VANDERHYE (57) ABSTRACT

An actuator and a method for controlling such an actuator suitable for operating at least one gas exchange valve arranged in a cylinder head of an internal combustion engine. The actuator includes: an actuator piston disc, a cylinder volume adapted for the actuator piston disc, where the actuator piston disc divides the cylinder volume in a first portion and a second portion, an inlet channel arranged between a pressure fluid inlet and the first portion of the cylinder volume, a controllable first inlet valve arranged in the inlet channel, a controllable second inlet valve arranged downstream the controllable first inlet valve, an outlet channel arranged between the first portion of the cylinder volume and a pressure fluid outlet, and a controllable outlet valve arranged in the outlet channel.

20 Claims, 6 Drawing Sheets

(56) References Cited

U.S. PATENT DOCUMENTS

| | | | |
|---|---|---|---|
| 10,344,683 B2* | 7/2019 | Hoglund | F01L 9/10 |
| 11,788,479 B2* | 10/2023 | Ivarsson | F01L 9/10 |
| | | | 123/90.12 |
| 2003/0150415 A1 | 8/2003 | Hedman | |
| 2016/0108777 A1* | 4/2016 | Hoglund | F01L 9/12 |
| | | | 123/90.12 |
| 2016/0230618 A1* | 8/2016 | Hoglund | F01K 5/02 |
| 2017/0037750 A1 | 2/2017 | Hoglund | |

FOREIGN PATENT DOCUMENTS

| | | |
|---|---|---|
| EP | 2545258 B1 | 1/2016 |
| EP | 3 058 188 | 8/2016 |
| EP | 3069068 B1 | 12/2018 |
| SE | 1351227 | 4/2015 |
| WO | 02/04790 | 1/2002 |
| WO | 2011/060855 | 5/2011 |
| WO | 2011/110181 | 9/2011 |
| WO | 2016/167715 | 10/2016 |
| WO | 2016/167716 | 10/2016 |

OTHER PUBLICATIONS

Written Opinion of the ISA for PCT/SE2021/050165 dated Mar. 17, 2021, 7 pages.
Extended Search Report, issued in European Patent Application No. 21764846.8 dated Mar. 15, 2024.

* cited by examiner

ACTUATOR AND METHOD FOR OPERATING AN ACTUATOR

CROSS-REFERENCE TO RELATED APPLICATIONS

This application is the U.S. national phase of International Application No. PCT/SE2021/050165 filed Mar. 1, 2021 which designated the U.S. and claims priority to SE Patent Application No. 2050230-8 filed Mar. 2, 2020, the entire contents of each of which are hereby incorporated by reference.

BACKGROUND OF THE INVENTION

Field of the Invention

The present invention relates in general to an actuator and a method for controlling such an actuator suitable for operating at least one gas exchange valve arranged in a cylinder head of an internal combustion engine.

Description of the Related Art

In a camshaft free combustion engine a pressure fluid, such as a liquid or a gas, is used to achieve a displacement/opening of one or more engine valves. This means that the camshafts, and related equipment, that conventional combustion engines use to open engine valves to let air in respective let exhaust fumes out from the combustion chamber, has been replaced by a less volume demanding and more controllable system.

In an engine that is constructed for significant angular torque outputs, the pressure in the combustion chamber is increasing proportional to an increased angular momentum output, and the force that is required to open the valve actuator to open the, in relation to the combustion chamber inward opening, engine valve is consequently also increased proportional to an increased angular momentum output. At high numbers of revolutions, such as 6-8000 rpm, a very fast opening of the engine valve is also required for the filling of air respective evacuation of exhaust fumes from the engine cylinder not to be restricted. These requirements, i.e., the need for an extremely fast opening at high frequencies in a high-performance engine having high counter pressure in the combustion chamber of the engine at the opening of the exhaust valves, require the pressure of the pressure fluid upstream of the valve actuator to be high, in the order of 8-30 bar.

There is a need in the art for a simple and reliable actuator for gas exchange valves which in a controllable and reliable manner can adjust the valve lift with high accuracy at low as well as high number of engine revolution.

SUMMARY OF THE INVENTION

An object of the present invention is to provide an actuator for axial displacement of an object which provides for a solution to the problem adjusting the displacement accurately and reliably at low and high actuating frequencies. It is another object of the present invention to provide a method for controlling axial displacement of an actuator with high accuracy and reliability at low and high actuating frequencies.

According to a first aspect of the present invention, there is provided an actuator 10 for axial displacement of an object, wherein said actuator 10 comprises:

an actuator piston disc 20,
a cylinder volume adapted for said actuator piston disc 20, where said actuator piston disc divides said cylinder volume in a first portion 22 and a second portion 23, where said piston disc 20 is movably arranged in an axial direction between a rest position and an active position,
an actuator piston rod 80 connected to said actuator piston disc 20 for guiding said actuator piston disc 20 in an axial direction,
an inlet channel 70 arranged between a pressure fluid inlet 11 and the first portion 22 of the cylinder volume for transporting pressure fluid from said pressure fluid inlet 11 to said first portion 22 of the cylinder volume,
a controllable first inlet valve 50 arranged in said inlet channel 70,
a controllable second inlet valve 26 arranged downstream said controllable first inlet valve 50 in said inlet channel 70,
an outlet channel 60 arranged between said first portion 22 of the cylinder volume and a pressure fluid outlet 12,
a controllable outlet valve 27 arranged in said outlet channel 60, and
each of said controllable first inlet valve (50), said controllable second inlet valve (26) and said controllable outlet valve (27) are individually electrically controlled.

An advantage of the present invention is that the axial displacement of the object can be adjustably and reliably controlled at very high actuating frequencies. Another advantage is that the actuator has a relatively simple design and is mechanically reliable.

Another advantage of this embodiment is that the activation and deactivation of said actuator is performed by operation of said controllable inlet valves and said controllable outlet valve.

In various example embodiments the actuator according further comprises:

a hydraulic circuit 28 comprising a non-return valve 29 to allow filling of hydraulic fluid in the hydraulic circuit 28, and a controllable emptying valve 30 to control the emptying of hydraulic fluid from the hydraulic circuit 28, and
an actuator piston rod opening 90 receiving said actuator piston rod 80, wherein an upper end 85 of the actuator piston rod 80 is arranged to be displaced in the axial direction relative to said hydraulic circuit 28 in connection with axial displacement of the actuator piston disc 20 in the cylinder volume.

An advantage of this embodiment is that a final position of said object may be accurately controlled.

In various example embodiments said controllable emptying valve, said controllable first inlet valve, said controllable second inlet valve, and/or said controllable outlet valve is configured so that a flow of the fluid (gas/liquid) is assisting an opening phase of said controllable valves.

The advantage of this embodiment is that the speed of opening the controllable valves is further enhanced.

In various example embodiment said controllable emptying valve 30 and said first controllable outlet valve 27 are controlled simultaneously.

The advantage of this embodiment is that the number of controlling elements is kept at a minimum. Another advantage of this embodiment is that the actuation of two valves may be performed without any electrical synchronization.

According to a second aspect of the present invention, there is provided a method for controlling axial displacement of an actuator piston disc 20 in an actuator 10, wherein the method for displacing the actuator piston disc from said rest position to said active position comprises the steps of:

setting said controllable outlet valve 27 in a closed position, and thereafter, setting said controllable first inlet valve 50 and said controllable second inlet valve 26 in an open position simultaneously during an overlapping time period which is shorter compared to an opening time of said controllable first inlet valve 50 and compared to an opening time of said controllable second inlet valve 26, wherein during said overlapping time period said pressure fluid is allowed to enter the first portion 22 of said cylinder volume for displacing said actuator piston disc 20, said method further comprising the step of: controlling individually and electrically each of said first controllable inlet valve (50), said controllable second inlet valve 26 and said controllable outlet valve 27.

The advantage of this embodiment is that a final variable active position of said actuator piston disc may be controlled accurately at high actuating frequency by controlling the position of said controllable first and second inlet valves.

Another advantage of this embodiment is that the activation and deactivation of said actuator is performed by operation of said controllable inlet valves and said controllable outlet valve.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DESCRIPTION OF THE PREFERRED EMBODIMENTS

Figure 1:
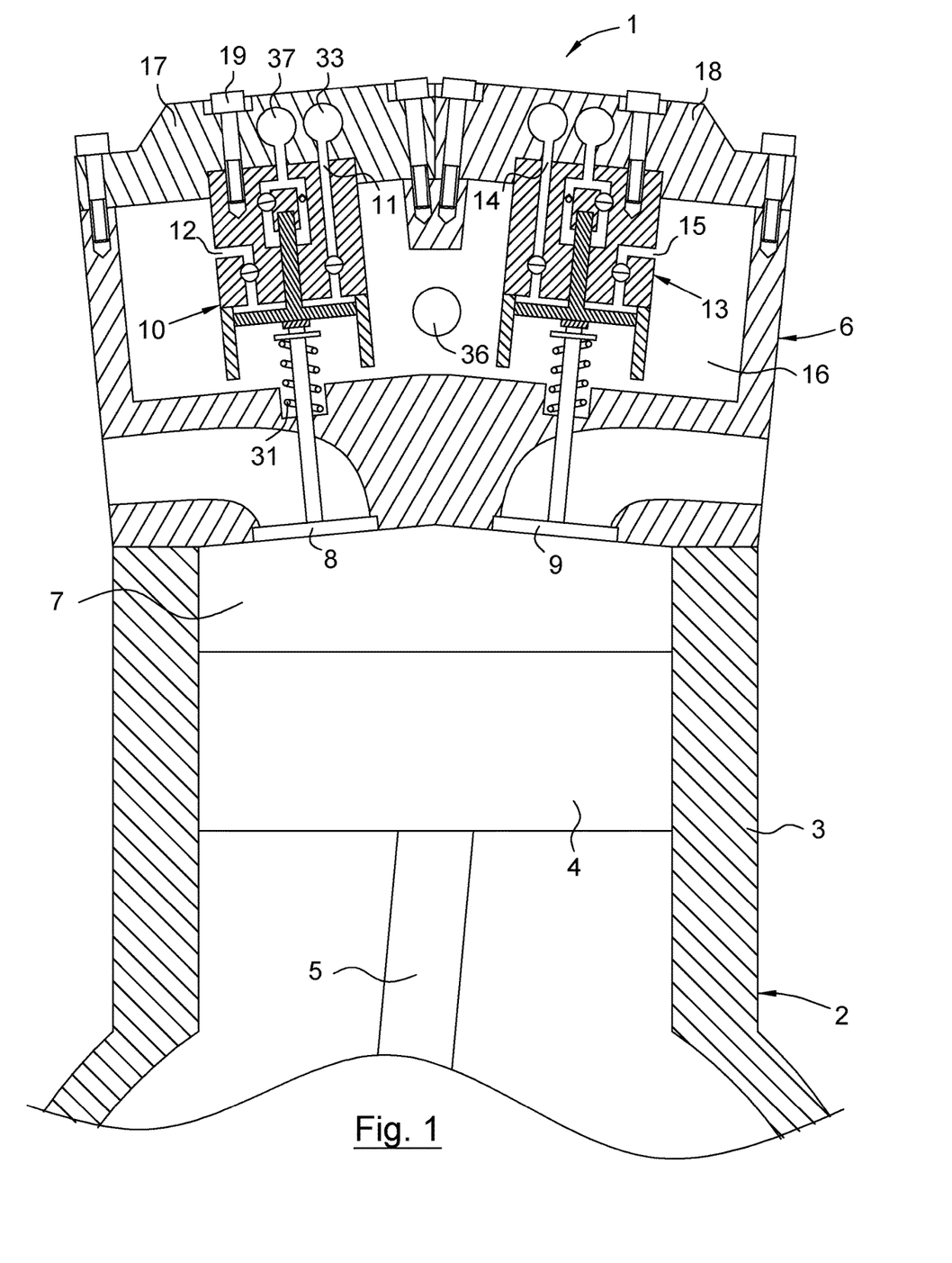
FIG. 1 is a schematic cross-sectional side view of a part of a combustion engine.

Reference is initially made to FIG. 1 that is a schematic depiction of a part of an inventive combustion engine, generally designated 1. The combustion engine 1 comprises a cylinder block 2 with at least one cylinder 3. Said cylinder block 2 may comprise one or a plurality of cylinders 3. In the shown embodiment one cylinder 3 is described, it should nevertheless be realized that the equipment described below in relation to the shown cylinder 3 is preferably applied to all of the cylinders of the combustion engine 1, in the embodiment the combustion engine comprises more cylinders.

Furthermore, the combustion engine 1 comprises a piston 4 that is axially displaceable in said cylinder 3. The movement, axial displacement forth and back, of the piston 4 is transferred on a conventional manner to a connection rod 5 connected with the piston 4, the connection rod 5 in turn is connected to and drives a crank shaft (not shown) in rotation.

The combustion engine 1 also comprises a cylinder head 6 that together with said cylinder 3 and said piston 4 delimits a combustion chamber 7. In the combustion chamber 7 the ignition of a mix of fuel and air occurs in a conventional manner and is not further described herein. The cylinder head 6 comprises a controllable first engine valve 8, also known as a gas exchange valve. In the shown embodiment, the cylinder head also comprises a controllable second engine valve 9. Said first engine valve 8 constitutes, in the shown embodiment, an inlet valve that is arranged to selectively open/close for supply of air to the combustion chamber 7. The second engine valve 9 constitutes in the shown embodiment an air outlet valve, or exhaust valve, that is arranged to selectively open/close for evacuation of exhausts form the combustion chamber 7.

The combustion engine 1 further comprises a first valve actuator 10 that is operatively connected to said first engine valve 8 and that is arranged in a closed pressure fluid circuit of the combustion engine 1. The first valve actuator 10 comprises at least one inlet opening 11 for pressure fluid and at least one outlet opening 12 for pressure fluid. The pressure fluid may be a gas or a gas mixture, preferably air or nitrogen gas. The pressure fluid may also be a hydraulic fluid. Air has the advantage that it is easy to change the pressure fluid or to supply more pressure fluid if the closed pressure fluid circuit leaks, and nitrogen gas has the advantage that it lacks oxygen, which prevents oxidation of other elements. In the shown embodiment the combustion engine 1 also comprises a second valve actuator 13 that is operatively connected to said second engine valve 9 and that is arranged in said closed pressure fluid circuit parallel with said first valve actuator 10. The second valve actuator 13 comprises at least one inlet opening 14 for pressure fluid and at least one outlet opening 15 for pressure fluid.

Each valve actuator can be operatively connected with one or more engine valves, for example the combustion engine may comprise two inlet valves which are jointly driven by the same valve actuator, however each valve actuator may drive one engine valve each to achieve the greatest possible control of the operation of the combustion engine 1.

In the description below, only the first valve actuator 10 will be described, but it should be realized that if nothing else is said, the corresponding is also true for the other valve actuator 13.

The combustion engine 1 also comprises a cylinder head chamber 16 that forms part of said closed pressure fluid circuit and that is delimited by said cylinder head 6 and at least a first cylinder head mantle 17. In the shown embodiment, a second cylinder head mantle 18 is also found that contributes to delimiting the cylinder head chamber 16. The cylinder head chamber 16 preferably presents a volume of the order of 3-10 liter, typically on the order of 5-6 liter. In an alternative embodiment, only said first cylinder head mantle 17 is present that, together with the cylinder head 6, alone delimit the cylinder head chamber 16.

Essential to the present invention is that the at least one outlet opening 12 of the first valve actuator 10 is in fluid communication with the cylinder head chamber 16, i.e., that the pressure fluid leaving the first valve actuator 10 via said at least one outlet opening 12 flows out in the cylinder head chamber 16.

In the shown embodiment the at least one outlet opening 15 of the second valve actuator 13 is in fluid communication with said cylinder head chamber 16, i.e., the outlet openings for pressure fluid of all the valve actuators may lead to the same cylinder head chamber.

Preferably, the whole of the first valve actuator 10 is arranged in said cylinder head chamber 16, and it is also preferred that the first valve actuator 10 is direct or indirect releasably connected to said first cylinder head mantle 17, for example by a bolt 19, or similar holding means. In this embodiment, the first valve actuator 10 accordingly "hangs" in the first cylinder head mantle 17 without being in contact with the cylinder head 6. If the first valve actuator 10 should be in contact with both the first cylinder head mantle 17 and the cylinder head 6, a construction wise disadvantageous tolerance chain is achieved.

In an alternative example embodiment, the actuator 10, 13 may be direct or indirect releasably connected to the cylinder head 6 in said cylinder head chamber 16. In such alternative embodiment the actuators 10, 13 are only in contact with the cylinder head mantle 17, 18. According to another alternative embodiment the actuators 10, 13 are not in contact with the cylinder head mantle 17, 18.

Reference is now primarily made to the FIGS. 2-7, which disclose the first valve actuator 10 in different states of operation.

The first valve actuator 10 comprises an actuator piston disc 20 and an actuator cylinder 21 delimiting a downward open cylinder volume, at least partly open. The actuator piston disc 20 divides said cylinder volume in a first upper part 22 and a second lower part 23 and is axially displaceable in said actuator cylinder 21. The actuator piston disc 20 forms part of an actuator piston, generally denoted 24, that is arranged to contact and drive said first engine valve 8. The actuator piston may further comprise means 25 for play elimination in axial direction in relation to said first engine valve 8. The play eliminating means 25 may be hydraulic, and assures that when the actuator piston disc 20 is in its upper turn position, the actuator piston 24 remains in contact with the first engine valve 8 when it is closed, for the purpose of correcting for assembly tolerances, heat expansion, etc. Accordingly, the axial length of the actuator piston 24 may be adjusted by way of the play eliminating means 25. Tolerance deviations may also be corrected in conventional way using shims.

The lower part 23 of the cylinder volume of the first valve actuator 10 is in fluid communication with said cylinder head chamber 16. This way, it is guaranteed that the same pressure acts on the actuator piston disc 20 from the first/upper part 22 of the cylinder volume respective from the second/lower part 23 of the cylinder volume when the actuator piston 24 is in the upper turn position. By that, the sealing between the actuator piston disc 20 and the actuator cylinder 21 is not critical, and some leakage can be allowed for minimizing the resistance to displacement of the actuator piston disc 20, and in resting position, the actuator piston disc is not affected by changes in the low-pressure level.

The first valve actuator 10 comprises a controllable first inlet valve 50 and a controllable second inlet valve 26 arranged in an inlet channel 70 and arranged to open/close said inlet channel 70, a controllable outlet valve 27 arranged in an outlet channel 60 and arranged to open/close said outlet channel 60, a hydraulic circuit, generally designated 28, that in turn comprises a non-return valve 29 arranged to allow filling of the hydraulic circuit 28, and a controllable emptying valve 30 arranged to control the emptying of the hydraulic circuit 28. The inlet channel 70 is arranged between a pressure fluid inlet opening 11 and the first portion 22 of the cylinder volume of the cylinder 21. The outlet channel 60 is arranged between a pressure fluid outlet opening 12 and the first portion 22 of the cylinder volume of the cylinder 21.

The actuator piston 24 also comprises an actuator piston rod 80 wherein the actuator piston rod 80 is arranged to guide the actuator piston 24 during axial displacement. The actuator 10 comprises an actuator piston rod opening 90 receiving said actuator piston rod 80, wherein an upper end 85 of the actuator piston rod 80 is arranged to be displaced in the axial direction relative to said hydraulic circuit 28 in connection with axial displacement of the actuator piston disc 20 in the cylinder volume.

It should be pointed out that the controllable valves in the valve actuator 10 are schematically depicted and can for example be constituted by sliding valves, seat valves, etc. Furthermore, several of the abovementioned controllable valves may be constituted by a single body. Each valve can further be directly or indirectly electrically controlled. With directly electrically controlled is meant that the position of the valve is directly controlled by, for example, an electro-magnetic device, and with indirect electrically controlled is meant that the position of the valve is controlled by a pressure fluid that in turn is controlled by, for example, an electro-magnetic device.

Figure 2:
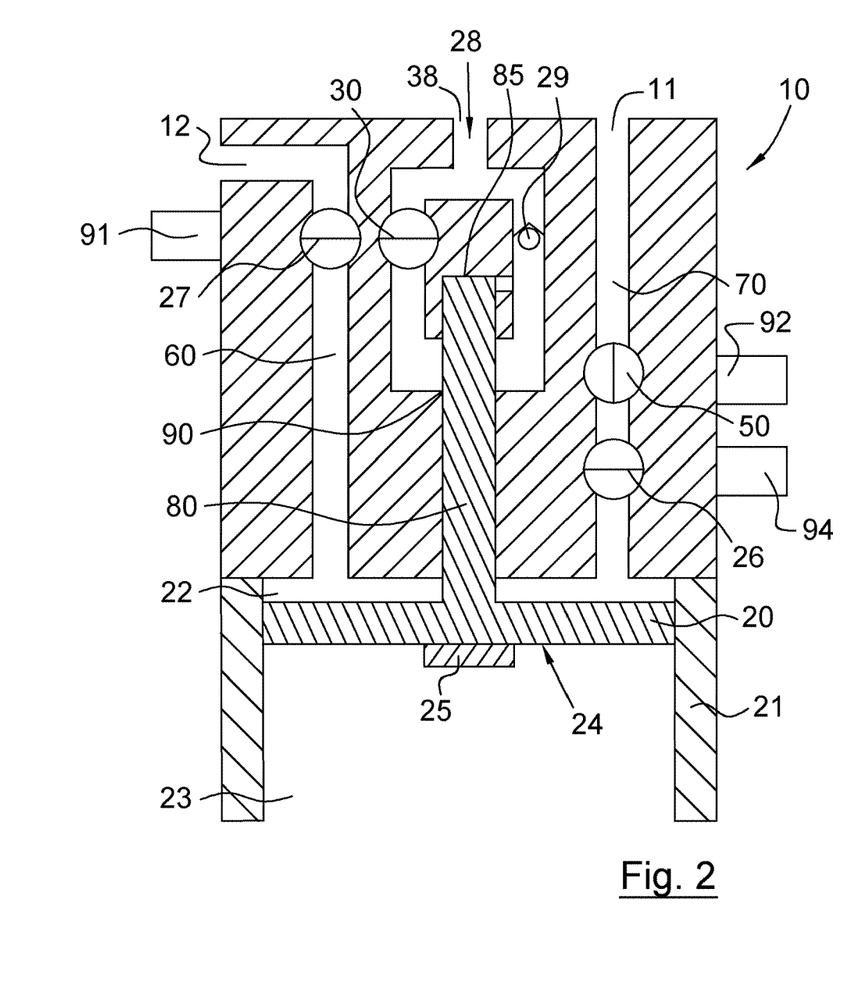
FIG. 2-7 show a schematic cross-sectional side view of a valve actuator in different states.

In FIG. 2, the first valve actuator 10 is in an inactive state and ready for being set in an active state. The second controllable inlet valve 26, the outlet valve 27, and the emptying valve 30 of the hydraulic circuit 28 are closed. The first controllable inlet valve 50 is open. The actuator piston disc 20 is accordingly in an upper position, and the actuator piston 24 is ready to open the engine valve (not shown in FIGS. 2-7, see FIG. 1). The controllable emptying valve 30 and said first controllable outlet valve 27 may be controlled simultaneously. The controllable emptying valve 30 for controlling the emptying of hydraulic fluid from the hydraulic circuit 28 and said controllable outlet valve 27 for controlling the emptying of pressure fluid from the first portion 22 of the cylinder volume, may be arranged in a single valve body unit. The controllable emptying valve 30 and said controllable outlet valve 27 may be operated by one single electromagnetic solenoid 91. The controllable first inlet valve 50, the controllable second inlet valve 26, the controllable outlet valve 27 and the controllable emptying valve 30 may be electromagnetically operated sliding valves, seating valves or ball valves. The controllable emptying valve 30 and said controllable outlet valve 27 may be arranged on a single valve shaft and may be operated by one single electromagnetic solenoid 91. Said controllable first inlet valve 50, said controllable second inlet valve 26, said controllable outlet valve 27 and said controllable emptying valve 30 may be controlled by a control unit. In FIG. 2 the controllable first inlet valve 50 is inactivated in its open position whereas the second controllable inlet valve 26, the controllable outlet valve 27 and the controllable emptying valve 30 are inactivated in the closed positions. This setup may help in saving consumed energy for the actuator 10 when in operation.

Figure 3:
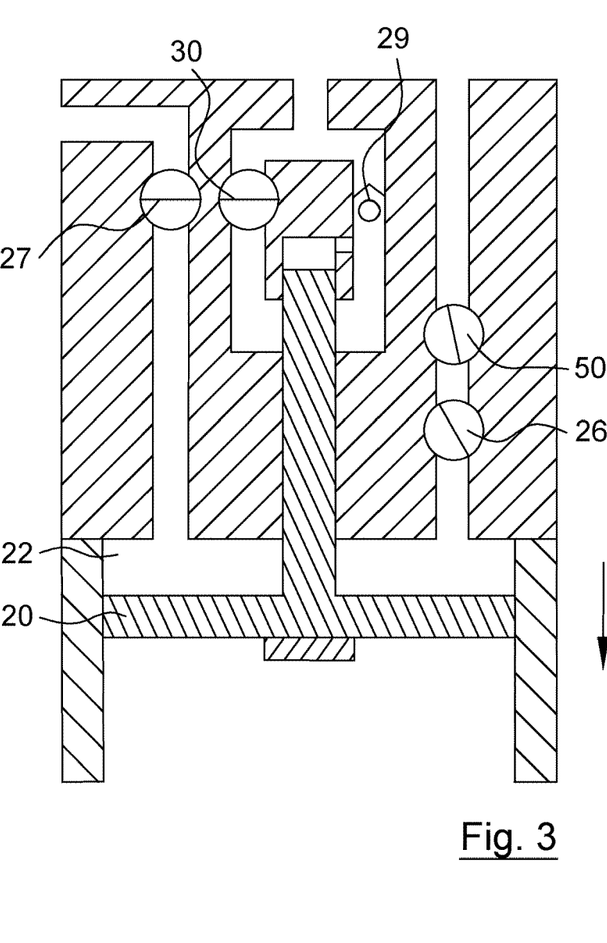

In FIG. 3, the second controllable inlet valve 26 has been opened to allow filling of pressure fluid with a high pressure to the upper part 22 of the cylinder volume, after which the actuator piston disc 20 starts a downward movement, i.e., is displaced downward, denoted by arrow in FIG. 3. The non-return valve 29 of the hydraulic circuit 28 allows for the hydraulic fluid to be sucked in and replace the volume that the actuator piston 24 leaves. Pressure fluid can only fill the upper part 22 of the cylinder volume when said first controllable inlet valve 50 and said second controllable inlet valve 26 are open simultaneously, i.e. overlapping. Said first controllable inlet valve 50 and said second controllable inlet valve 26 may be in said open position simultaneously during a so-called overlapping time period. The overlapping time period is shorter compared to an opening time of said controllable first inlet valve 50 and compared to an opening time of said controllable second inlet valve 26. It should be noted that said first controllable inlet valve 50 and said second controllable inlet valve 26 during said overlapping time period need not be fully open, i.e., the first controllable inlet valve 50 and/or said second controllable inlet valve 26 may be partially open during said overlapping time period. By partly open means that the specific valve is in motion from fully closed to fully open, or from fully open to fully closed. The use of two valves in series in said inlet channel 70 is used for controlling the amount of pressure fluid to enter the upper part 22 of the cylinder volume. A final active position of said piston disc 20 may be defined by the overlapping time period and the pressure of the pressure fluid. In various example embodiments of the present invention said pressure of said pressure fluid is kept at a constant pressure, i.e. the final active position of said piston disc 20 is then defined by the overlapping time period only. Although the opening time for said first controllable inlet valve 50 and the opening time for said second controllable inlet valve 26 may be relatively long, said overlapping time period may be relatively short. The length of said overlapping time period may be adjusted by shifting the opening time of the first controllable inlet valve 50 relative to the opening time of said second controllable inlet valve 26. The first controllable inlet valve 50 is operated by an electromagnetic solenoid 92. The second controllable inlet valve 26 is operated by an electromagnetic solenoid 94. The overlapping time period is typically less than 3 ms. In various example embodiment said overlapping time period is between 1-2 ms.

Figure 4:
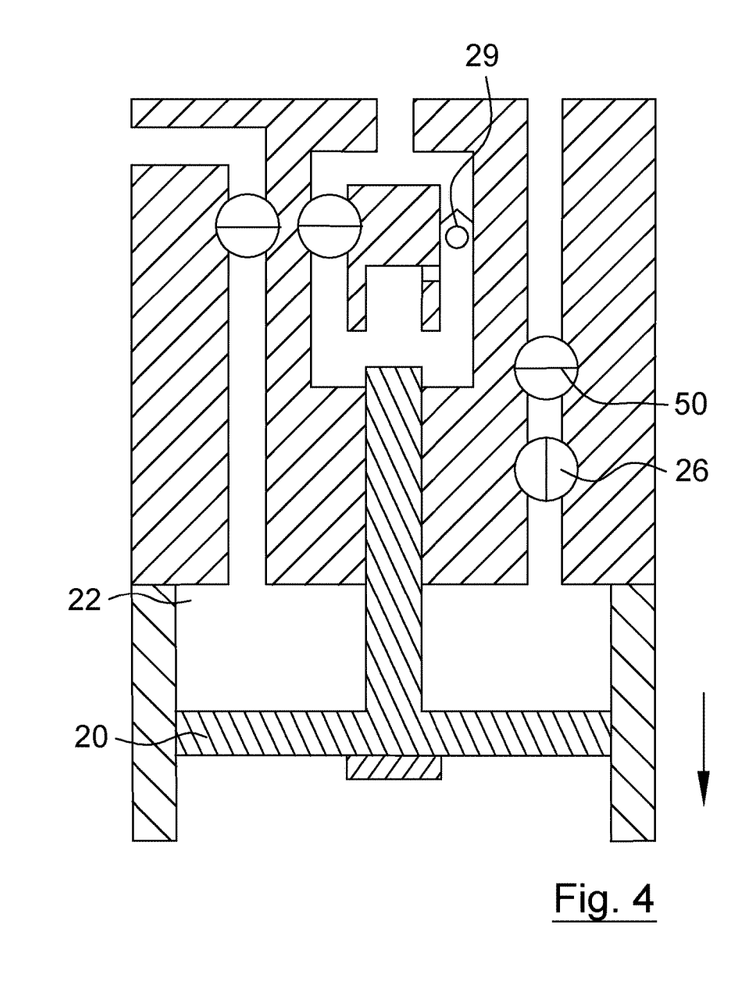

In FIG. 4, the first controllable inlet valve 50 has been closed and the pressure fluid that has entered into the upper part 22 of the cylinder volume is allowed to expand, during which the actuator piston disc 20 continues its movement downward denoted by arrow in FIG. 4. The non-return valve 29 of the hydraulic circuit 28 is still open. Although the first controllable inlet valve 50 is closed the movement of said piston disc 20 is not stopped abruptly. The movement of the piston disc 20 will continue a predetermined period of time after the inlet channel 70 has been closed due to the expansion of already entered gas in the upper part 22 of the cylinder volume.

Overlap time-period scenario 1: In a first sub-step said first controllable inlet valve 50 is set in an at least partially open position and said second controllable inlet valve 26 is set to a fully closed position. In a second sub-step said second controllable inlet valve 26 is set in an at least partly opened position. In a third sub-step said first controllable inlet valve 50 is fully closed. In a fourth step said second controllable inlet valve 26 is fully closed. According to this scenario there are no high-pressure gas remaining in-between the first controllable valve 50 and said second controllable valve 26 when they are both in closed position.

Overlap time period scenario 2: In a first sub-step said second controllable inlet valve 26 is set in an at least partially open position and said first controllable inlet valve 50 is set to a fully closed position. In a second sub-step said first controllable inlet valve 50 is set in an at least partly open position. In a third sub-step said second controllable inlet valve 26 is fully closed. In a fourth sub-step said first controllable inlet valve 50 is fully closed. According to this scenario there is a high-pressure gas amount trapped in-between the first controllable inlet valve 50 and said second controllable inlet valve 26 when they are both in closed position. This trapped amount of high-pressure gas, which can be considered to be a wasted gas volume, in-between said first controllable inlet valve 50 and said second controllable inlet valve 26 may influence the controllability of the position of the piston disc 20 in the next cycle.

Said first controllable inlet valve 50 and said second controllable inlet valve 26 may during at least a portion of the overlap time period both be located or set in a partly open position.

In an example embodiment a closing of said first controllable inlet valve 50 may be initiated before an opening of said second controllable inlet valve 26 is initiated in order to create said overlap time period. After said overlap time period the first controllable inlet valve 50 and said second controllable inlet valve 26 may return to an initial condition where said first controllable inlet valve 50 is open and said second controllable inlet valve 26 is closed.

In an example embodiment a closing of said second controllable inlet valve 26 may be initiated before an opening of said first controllable inlet valve 50 is initiated in order to create said overlap time period. After said overlap time period the first controllable inlet valve 50 and said second controllable inlet valve 26 may return to an initial condition where said first controllable inlet valve 50 is closed and said second controllable inlet valve 26 is open.

Figure 5:
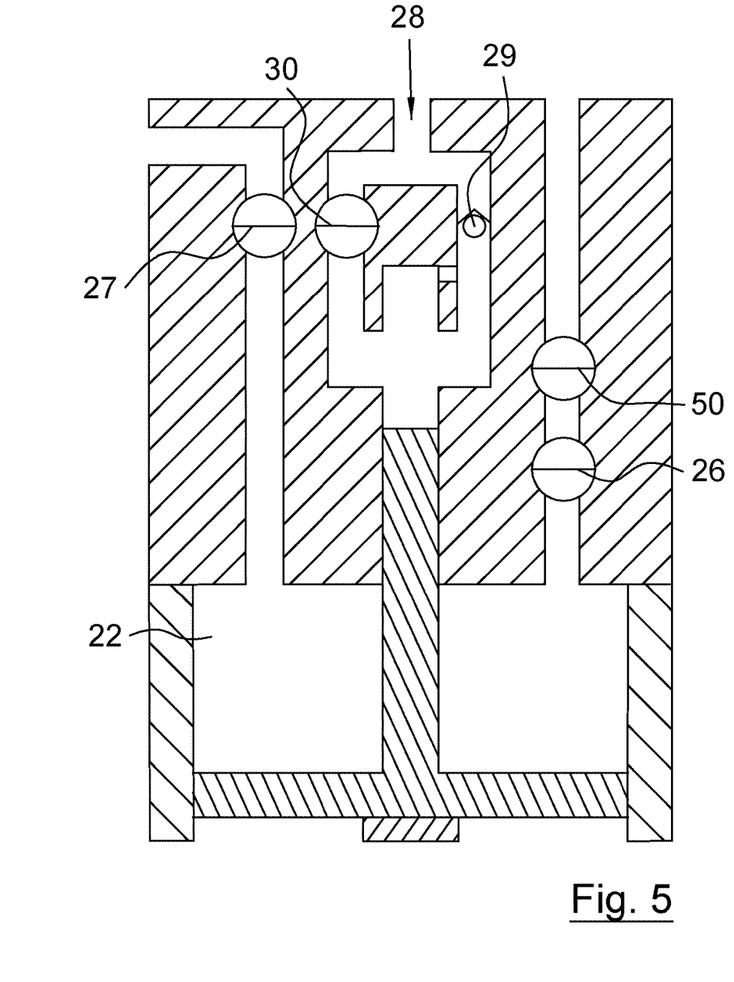

In FIG. 5, the pressure fluid in the upper part 22 of the cylinder volume is not capable of displacing the actuator piston disc 20 further. Thus, the pressure on the lower side of the actuator piston disc 20 and the return spring 31 of the first engine valve 8 may be as high as the pressure on the upper side of the actuator piston disc 20. The actuator piston disc 20 is kept in place (is locked) in its lower position a desired amount of time by the emptying valve 30 of the hydraulic circuit 28 being kept closed at the same time as the non-return valve 28 of the hydraulic circuit 28 is closed automatically. Thus, after the flow of pressure fluid in the inlet channel 70 is closed at least one of the second inlet valve 26 and the first inlet valve 50 must be fully closed.

Figure 6:
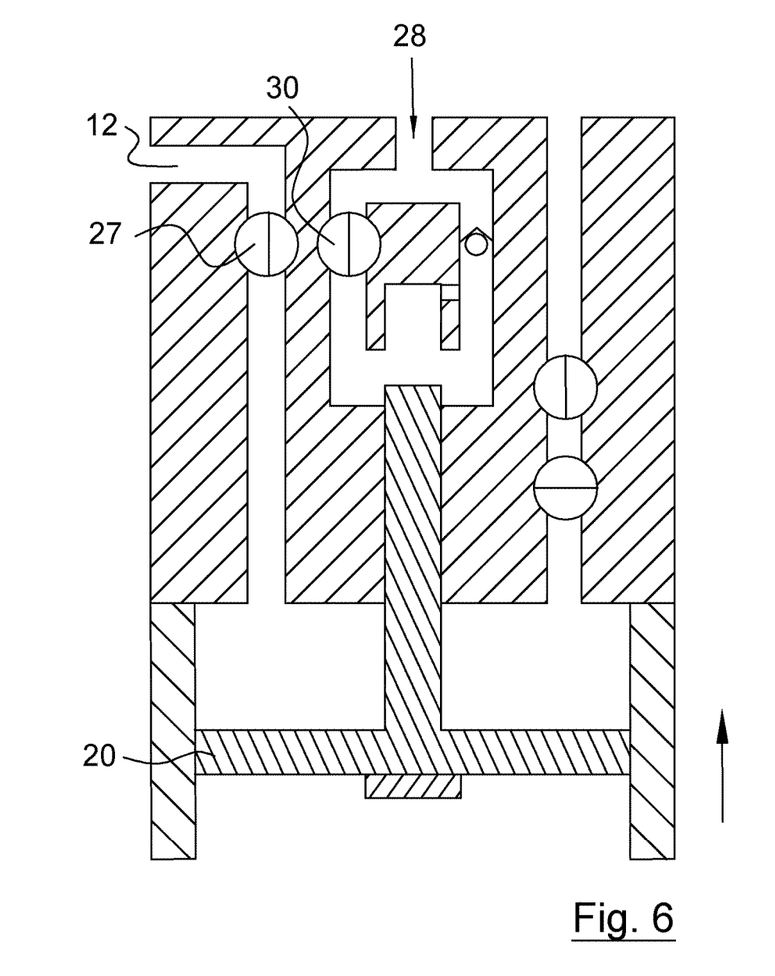

According to the disclosed embodiment the second inlet valve 26 is set in the fully closed position before the first inlet valve 50 is opened, i.e., FIG. 5, and thereafter the first inlet valve 50 is opened, i.e., FIG. 6.

In FIG. 6, the outlet valve 27 has been opened to admit an evacuation of pressure fluid from the upper part 22 of the cylinder volume, and additionally the emptying valve 30 of the hydraulic circuit 28 has been opened, after which the actuator piston disc 20 is displaced upwards, denoted by arrow in FIG. 6, when the hydraulic fluid is evacuated from the hydraulic circuit 28, and at the same time pressure fluid is evacuated from the upper part 22 of the cylinder volume to the cylinder head chamber 16.

Figure 7:
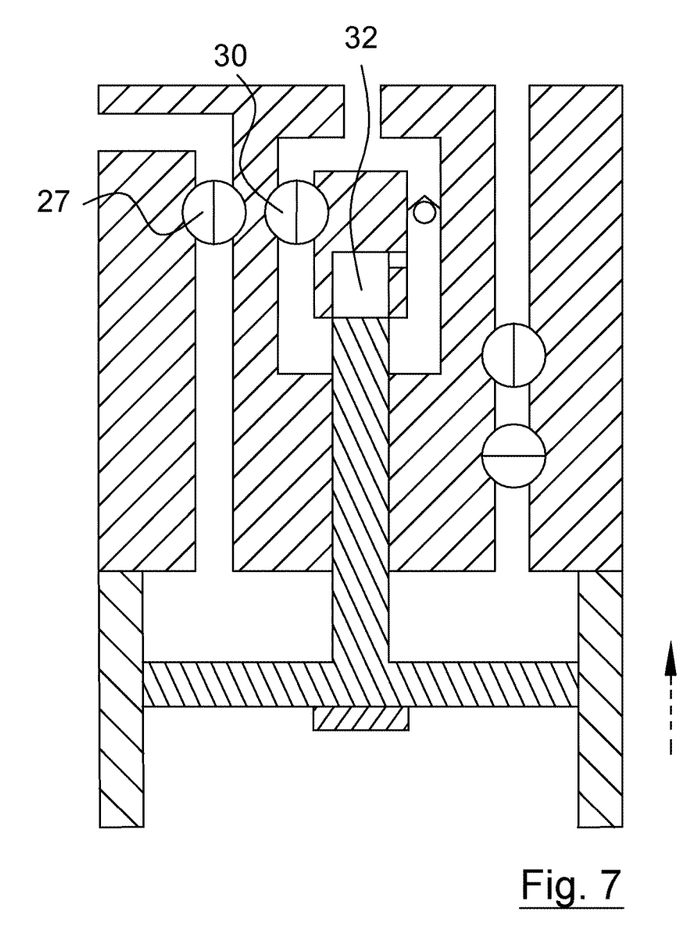

In FIG. 7, the outlet valve 27 and the emptying valve 30 of the hydraulic circuit 28 are still open, and the return movement of the actuator piston 24 may be slowed down by way of a hydraulic break means 32 incorporated in the hydraulic circuit 28.

The hydraulic fluid is preferably oil, and most preferably of the same type as the normal engine oil of the combustion engine 1.

Figure 8:
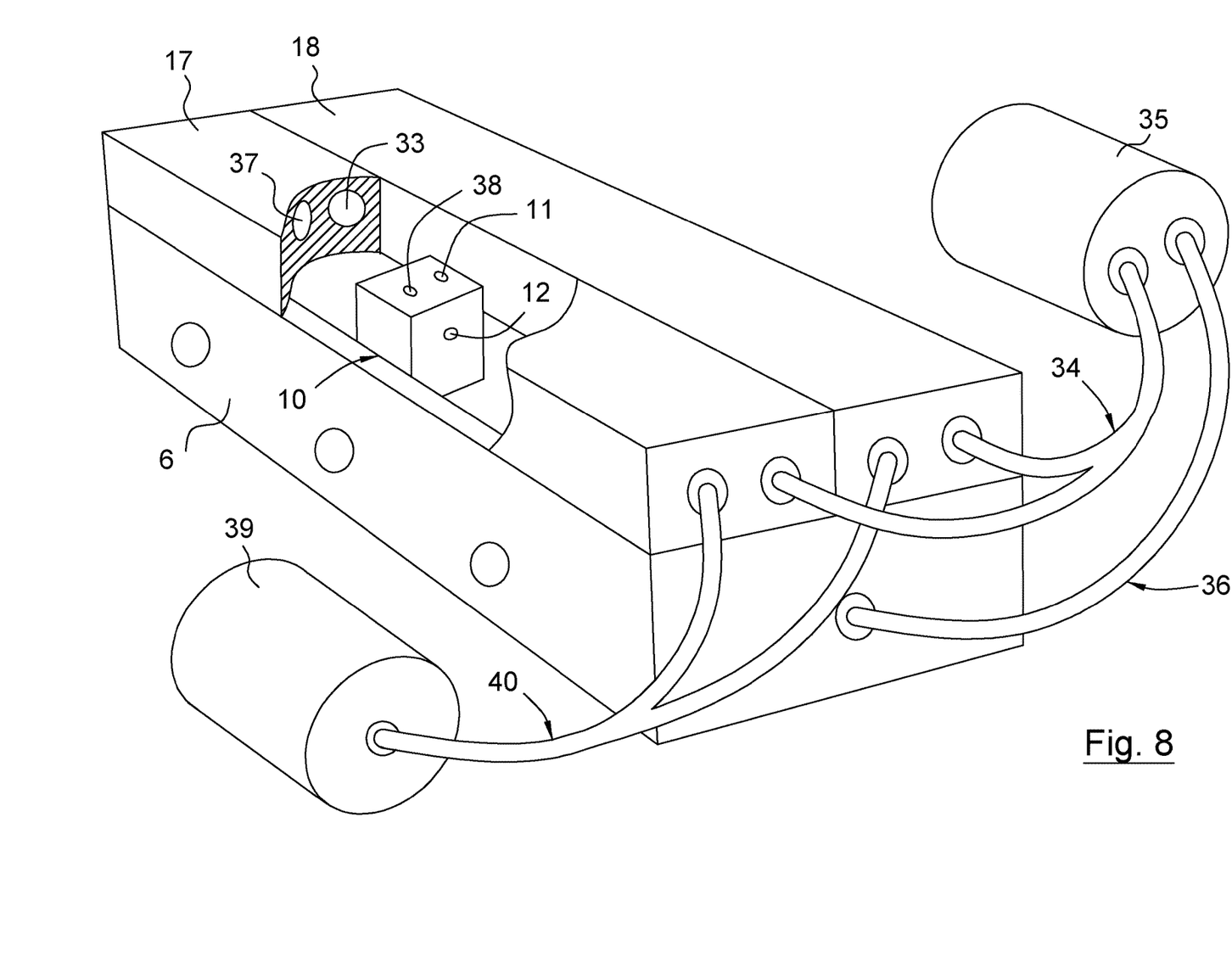
FIG. 8 is a partly cross-sectional schematic perspective view of a cylinder head and cylinder head mantles.

Reference is now made to FIG. 8, which schematically shows the cylinder head 6, the first cylinder head mantle 17 and the second cylinder head mantle 18.

The first cylinder head mantle 17 comprises a pressure fluid manifold 33 that is connected to the at least one inlet opening 11 of the first valve actuator 10. The pressure fluid manifold 33 extends along the axial length of the first cylinder head mantle 17. Said pressure fluid manifold 33 forms part of a primary pressure fluid channel 34 that extends from a compressor 35 to the at least one inlet opening 11 of the first valve actuator 10. The compressor 35 is arranged to supply a pressure fluid under high pressure to the valve actuators. Furthermore, a secondary pressure fluid channel 36 (see also FIG. 1) extends from the cylinder head chamber 16 to said compressor 35.

The volume of the primary pressure fluid channel 34, high pressure side, shall be kept as small as possible so that the temperature of the pressure fluid will sink as little as possible from the compressor 35 to the first valve actuator 10. The volume of the cylinder head chamber 16 and the secondary pressure fluid channel 36, low pressure side, shall on the other hand be maximized so that the pressure ratio between the low-pressure side and the high pressure side is affected as little as possible when the compressor 35 pulls gas/pressure fluid from the low pressure side. Preferably, the volume of the cylinder head chamber 16 and the secondary pressure fluid channel 36 is at least ten times greater than the volume of the primary pressure fluid channel 34, most preferably at least 15 times greater.

The compressor 35 has variable compressor volume/displacement, or by other means adjustable outflow, and generally the compressor 35 is driven by the crank shaft of the combustion engine 1. At high numbers of revolutions and high torque output, higher pressure of the pressure fluid in the primary pressure fluid channel 34 is required, and at low numbers of revolutions and low torque output, lower pressure of the pressure fluid in the primary pressure fluid channel 34 is required.

The pressure level on the high pressure side in in the order of 8-30 bar to, with sufficient speed, open an inward opening engine valve where a high counter pressure is present in the combustion chamber, and the pressure level on the low pressure side is in the order of 4-8 bar to hold the pressure ratio below 1:4, preferably below 1:3. The aim is to hold the temperature of the pressure fluid in the primary pressure fluid channel 34 below 120° C. under normal operation for avoiding oxidizing a hydraulic fluid mist that is present in the pressure fluid, however temperatures up to 150° C. can be allowed for short periods.

The first cylinder head mantle 17 further comprises a hydraulic liquid manifold 37 that is connected to an inlet opening 38 of said hydraulic circuit 28 of the first valve actuator 10. The hydraulic liquid manifold 37 extends along the axial length of the first cylinder head 17, parallel to the pressure fluid manifold 33. A pump 39, or the like, is arranged to supply a pressurized hydraulic liquid to the hydraulic liquid manifold 37 via a conduit 40.

The first cylinder head mantle 17 may further comprise all necessary electric infrastructure (not shown) for, among other things, controlling the first valve actuator 10, for various sensors, etc.

In some internal combustion engines 1, the first engine valve 8 (air supply valve) and the second engine valve 9 (exhaust valve) may be arranged at an angle in relation to one another, i.e., their respective valve shafts point in different directions in relation to the engine cylinders 3, and the first valve actuator 10 must be arranged in line with the first shaft of the first engine valve 8 to achieve optimum operation. As a result of the relative separating orientation and of the valve actuators being connected with respective cylinder head mantle before these are mounted on the cylinder head 6, in various example embodiments the first cylinder head mantle 17 may be applied on the cylinder head 6 in line with the shaft of the first engine valve 8 and that the second cylinder head mantle 18 may be applied on the cylinder head 6 in line with the shaft of the second engine valve 9.

Figure 9A:
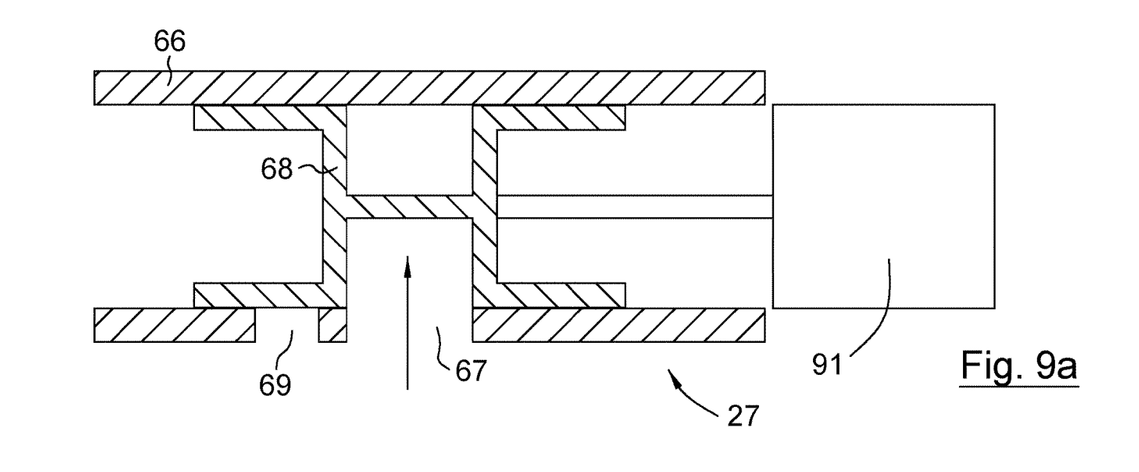
FIG. 9a-9b depicts schematic side views of a controllable valve in inactive and active position, respectively.
Figure 9B:
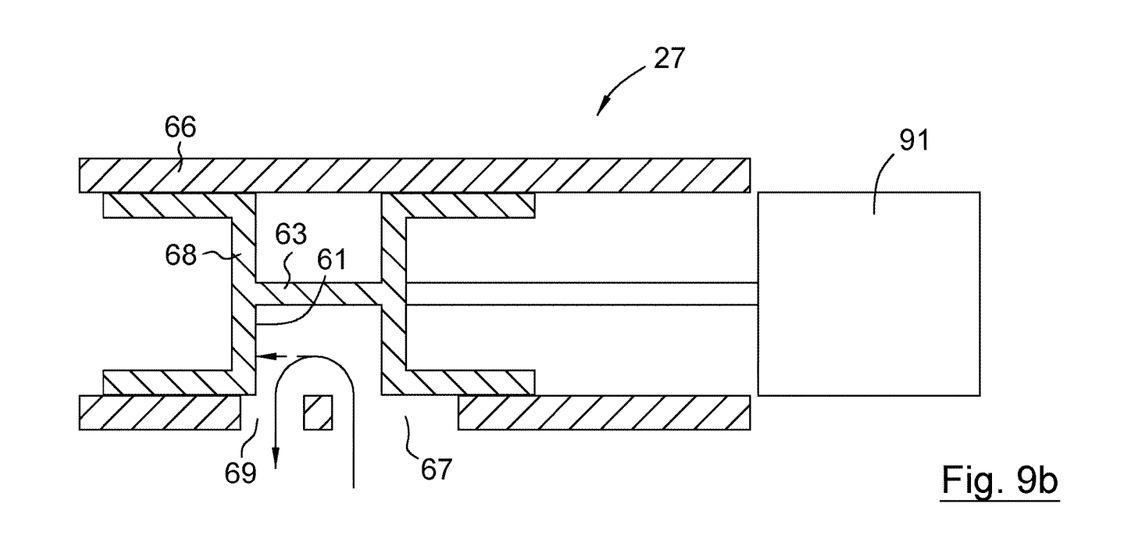

FIGS. 9a, 9b depicts an example embodiment of a valve 27 in open and closed position respectively. The valve may also be any one of the controllable inlet valves 26, 50 or the controllable emptying valve 30. Here, the valve 27 is a sliding valve comprising a body 66 in which a sliding member 68 is arranged. The sliding member 68 can slide/move between two end positions defining a closed position and an open position, respectively. In FIG. 9a the valve 27 is in the closed position, i.e., the inlet 67 for oil or gas is open whereas the outlet 69 is closed. In FIG. 9b the valve 27 is in the open position. The sliding member 68 has been pushed from the right to the left by a solenoid 91, i.e., when the solenoid 91 is active the valve 27 is open and when the solenoid is inactive the valve 27 is closed. According to an alternative embodiment, the solenoid 91 is arranged to the left in FIGS. 9a and 9b instead of to the right, thereby the valve 27 is open when the solenoid 91 is inactive and the valve 27 is closed when the solenoid 91 is active. In the open position oil/gas is allowed to pass freely from the inlet 67 to the outlet 69. The oil/gas is acting on the sliding member such that it is assisting in the opening phase, i.e., the direction of the oil will help the solenoid in opening the valve by forcing the oil/gas onto a flange portion 61 of said sliding member 68. The more protruded said flange is from a central axis 63 the more assistance to the opening phase.

Said controllable first inlet valve 50, said controllable second inlet valve 26 and said controllable outlet valve 27 may be individually electrically controlled. Valves 50, 26, 27 may be individually controlled. Piston disc 20 may be set in an open position by a short pressure pulse from pressure fluid inlet 11 at the same time as pressure fluid outlet 12 is closed. Piston disc may maintain its open position by closing pressure fluid inlet 11, i.e., piston disc 20 may maintain an active open position, despite the fact that both inlet pressure fluid and inlet pressure outlet are closed. In order to set the piston disc 20 in an inactive state, the pressure fluid outlet may be opened by opening outlet valve 27. This may considerably reduce the energy required to maintain the piston disc in an open position. Only a short pressure pulse may set the piston disc 20 in an open position and thereafter there is no active pressure required for maintaining the open position of said piston disc 20.

Conceivable Modifications of the Invention

The invention is not limited to only the abovementioned and embodiments shown in the drawings, which only have an illustrating and exemplifying purpose. This patent application is intended to cover all modifications and variants of the preferred embodiments described herein, and the present invention is consequently defined by the wording of the enclosed claims and the equipment can thus be modified in all conceivable ways within the framework of the enclosed claims.

It should also be pointed out that all information about/concerning terms such as above, below, upper, lower, etc. shall be interpreted/read with the equipment oriented in accordance with the figures, with the drawings oriented in such a way that the reference numbers can be read in a correct manner. Consequently, such terms indicates only relative relationships in the shown embodiments, which relationships can be changed if the equipment according to the invention is provided with another construction/design.

It should be pointed out that even if it is not explicitly stated that features from a specific embodiment can be combined with the features of another embodiment, this should be regarded as obvious when so is possible.

The invention claimed is:

1. An actuator for axial displacement of an object, wherein said actuator comprises:
   an actuator piston disc,
   a cylinder volume adapted for said actuator piston disc, where said actuator piston disc divides said cylinder volume in a first portion and a second portion, where said piston disc is movably arranged in an axial direction between a rest position and an active position,
   an actuator piston rod connected to said actuator piston disc for guiding said actuator piston disc in an axial direction,
   an inlet channel arranged between a pressure fluid inlet and the first portion of the cylinder volume for transporting pressure fluid from said pressure fluid inlet to said first portion of the cylinder volume,
   a controllable first inlet valve arranged in said inlet channel,
   a controllable second inlet valve arranged downstream said controllable first inlet valve in said inlet channel,
   an outlet channel arranged between said first portion of the cylinder volume and a pressure fluid outlet, and
   a controllable outlet valve arranged in said outlet channel, wherein each of said controllable first inlet valve, said controllable second inlet valve and said controllable outlet valve are individually electrically controlled.

2. The actuator according to claim 1, further comprising:
   a hydraulic circuit comprising a non-return valve to allow filling of hydraulic fluid in the hydraulic circuit, and a controllable emptying valve to control the emptying of hydraulic fluid from the hydraulic circuit, and
   an actuator piston rod opening receiving said actuator piston rod, wherein an upper end of the actuator piston rod is arranged to be displaced in the axial direction relative to said hydraulic circuit in connection with axial displacement of the actuator piston disc in the cylinder volume.

3. The actuator according to claim 2, wherein said controllable emptying valve is configured so that a flow of said hydraulic fluid is assisting an opening phase of said controllable emptying valve.

4. The actuator according to claim 1, wherein at least one of said controllable first inlet valve, said controllable second inlet valve or said controllable outlet valve is configured so that a flow of said pressure fluid is assisting an opening or closing phase of said controllable first inlet valve, controllable second inlet valve and/or said controllable outlet valve.

5. The actuator according to claim 2, wherein said controllable emptying valve and said first controllable outlet valve are controlled simultaneously.

6. The actuator according to claim 2, wherein said controllable emptying valve for controlling the emptying of hydraulic fluid from the hydraulic circuit and said controllable outlet valve for controlling the emptying of pressure fluid from the first portion of the cylinder volume, are arranged in a single valve body unit.

7. The actuator according to claim 6, wherein said controllable emptying valve and said controllable outlet valve are operated by one single electromagnetic solenoid.

8. The actuator according to claim 1, wherein the controllable first inlet valve, the controllable second inlet valve, the controllable outlet valve and the controllable emptying valve are electromagnetically operated sliding valves, seating valves or ball valves.

9. The actuator according to claim 1, further comprising a control unit for controlling said controllable first inlet valve, said controllable second inlet valve, said controllable outlet valve and said controllable emptying valve.

10. A method for controlling axial displacement of an actuator piston disc in an actuator according to claim 1, wherein the method for displacing the actuator piston disc from said rest position to said active position comprises the steps of:
    setting said controllable outlet valve in a closed position, and thereafter,
    setting said controllable first inlet valve and said controllable second inlet valve in an open position simultaneously during an overlapping time period which is shorter compared to an opening time of said controllable first inlet valve and compared to an opening time of said controllable second inlet valve, wherein during said overlapping time period said pressure fluid is allowed to enter the first portion of said cylinder volume for displacing said actuator piston disc, wherein said method further comprising the step of:
    controlling individually and electrically each of said first controllable inlet valve, said controllable second inlet valve and said controllable outlet valve.

11. The method according to claim 10, wherein the controllable first inlet valve is closing while said controllable second inlet valve is opening.

12. The method according to claim 10, wherein the overlapping time period is shorter than 3 ms.

13. The method according to claim 10, further comprising, for displacing said actuator piston disc in the actuator from the active position to the rest position, the steps of:
    opening said controllable outlet valve.

14. The method according to claim 10, wherein said actuator further comprises:
    a hydraulic circuit comprising a non-return valve to allow filling of hydraulic fluid in the hydraulic volume, and a controllable emptying valve to control the emptying of hydraulic fluid from the hydraulic circuit, and
    an actuator piston rod opening receiving said actuator piston rod, wherein an upper end of said actuator piston rod is arranged to be displaced in the axial direction relative to said hydraulic circuit in connection with axial displacement of the actuator piston disc in the cylinder volume,
    wherein the actuation of said controllable outlet valve and said controllable emptying valve is performed by a single electromagnetic solenoid.

15. The method according to claim 14, wherein said controllable outlet valve and said controllable emptying valve are closed when the actuator piston disc has reached the rest position in said cylinder volume.

16. A cylinder head for an internal combustion engine comprising at least one actuator according to claim 1, arranged so as to operate at least one inlet valve or at least one outlet valve arranged in said cylinder head.

17. An internal combustion engine comprising at least one actuator according to claim 1, arranged so as to operate at least one inlet valve or at least one outlet valve of said internal combustion engine.

18. A vehicle comprising an internal combustion engine according to claim 17 arranged to provide propulsion of said vehicle.

19. The actuator according to claim 2, wherein at least one of said controllable first inlet valve, said controllable second inlet valve or said controllable outlet valve is configured so that a flow of said pressure fluid is assisting an opening or closing phase of said controllable first inlet valve, controllable second inlet valve and/or said controllable outlet valve.

20. The actuator according to claim 3, wherein at least one of said controllable first inlet valve, said controllable second inlet valve or said controllable outlet valve is configured so that a flow of said pressure fluid is assisting an opening or closing phase of said controllable first inlet valve, controllable second inlet valve and/or said controllable outlet valve.

\* \* \* \* \*